United States Patent [19]

Osato

[11] Patent Number: 5,502,692
[45] Date of Patent: Mar. 26, 1996

[54] METHOD AND APPARATUS FOR RECORDING, REPRODUCING AND OVERWRITING INFORMATION ON OR FROM A MAGNETOOPTIC DISK HAVING THREE MAGNETIC LAYERS

[75] Inventor: Yoichi Osato, Yokohama, Japan

[73] Assignee: Canon Kabushiki Kaisha, Tokyo, Japan

[21] Appl. No.: 37,179

[22] Filed: Mar. 24, 1993

Related U.S. Application Data

[63] Continuation of Ser. No. 578,210, Sep. 6, 1990, abandoned.

[30] Foreign Application Priority Data

Sep. 6, 1989 [JP] Japan .................... 1-231845

[51] Int. Cl.$^6$ .................... G11B 13/04; G11B 11/12
[52] U.S. Cl. .................... 369/13; 360/59
[58] Field of Search .................... 369/13; 360/59, 360/114, 66, 131; 365/122, 10, 22, 27, 32

[56] References Cited

U.S. PATENT DOCUMENTS

| | | | |
|---|---|---|---|
| 4,059,828 | 11/1977 | Kobayashi et al. | 365/27 |
| 4,771,347 | 9/1988 | Horimai et al. | 360/59 |
| 4,908,809 | 3/1990 | Tadokoro et al. | 360/131 |
| 4,955,007 | 9/1990 | Aratani et al. | 360/59 |

FOREIGN PATENT DOCUMENTS 63-316343 12/1988 Japan .

OTHER PUBLICATIONS

Electronics, "Simple Nikon Technique permits erase and write in one pass", Electronics/Apr. 16, 1987, p. 33.

*Primary Examiner*—Hoa T. Nguyen
*Attorney, Agent, or Firm*—Fitzpatrick, Cella, Harper & Scinto

[57] ABSTRACT

There are provided magnetooptic recording and reproducing method and apparatus of the Curie point writing type in which recording information can be read out by using a magnetic Kerr effect and the overwriting can be performed. At a position away from a laser irradiating section of a magnetooptic recording disk having first to third magnetic layers, there is applied a predetermined magnetic field which can magnetize the third magnetic layer in a uniform perpendicular direction and can magnetize the second magnetic layer in a uniform in-surface direction. Then, a recording bias magnetic field is applied to the laser irradiating section of the disk and a laser beam of a power such as to raise the temperature of the disk to a value near the Curie point of the first magnetic layer is simultaneously irradiated in accordance with a recording signal, thereby orienting the magnetizing direction of the first magnetic layer to a stable direction for the third magnetic layer without changing the magnetizing direction thereof. Or, a recording bias magnetic field is applied to the laser irradiating section of the disk and only a laser power so as to raise the temperature of the disk to a value near the Curie point of the third magnetic layer is simultaneously irradiated, thereby reversing the magnetizing direction of the third magnetic layer and magnetizing the first magnetic layer to a stable direction for the third magnetic layer.

11 Claims, 7 Drawing Sheets

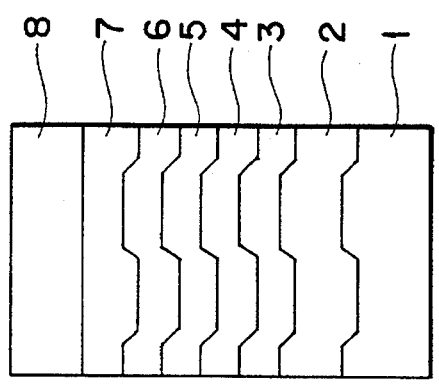
FIG. 1B
FIG. 1A
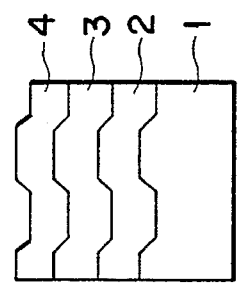
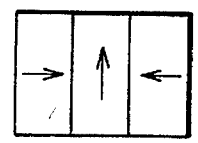
FIG. 2E
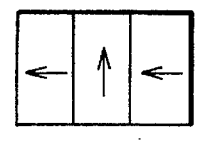
FIG. 2D
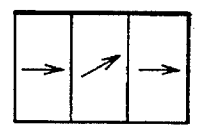
FIG. 2C
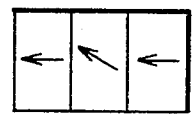
FIG. 2B
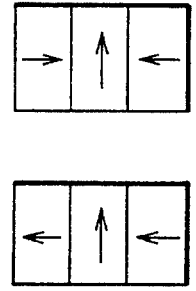
FIG. 2A

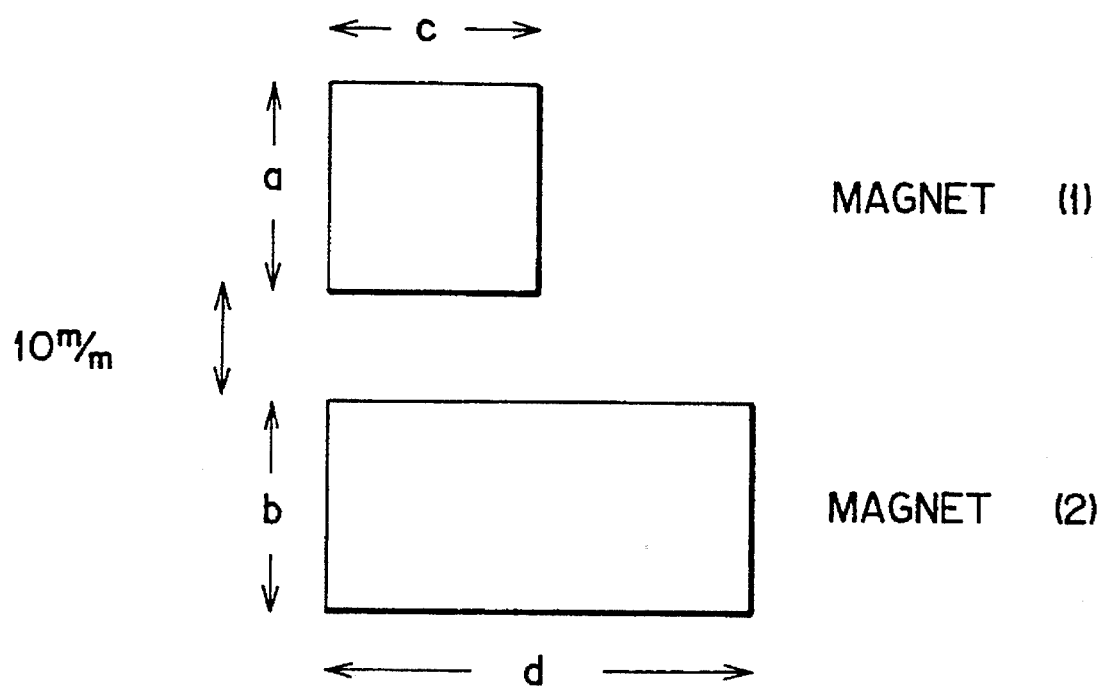

METHOD AND APPARATUS FOR RECORDING, REPRODUCING AND OVERWRITING INFORMATION ON OR FROM A MAGNETOOPTIC DISK HAVING THREE MAGNETIC LAYERS

This application is a continuation of prior application, Ser. No. 07/578,210 filed Sep. 6, 1990, now abandoned.

BACKGROUND OF THE INVENTION

1. Field of the Invention

The present invention relates to a magnetooptical recording and reproducing method and apparatus of a Curie point writing type in which information can be read out and overwritten by using a magnetic Kerr effect.

2. Related Background Art

A magnetooptic disc has been known as an erasable optical disk memory. The magnetooptic disk has an advantage such that high density recording, contactless recording and reproduction, and the like can be performed as compared with a magnetic recording medium using a magnetic head. To record information in such a magnetooptic disk, in general, it is necessary to erase (magnetize in one direction, that is, initialize) the recorded portion before recording.

As a recording method in which the erasure before recording is unnecessary, there have been proposed some ideas, for example, (1) recording and reproducing heads are individually provided, or (2) a continuous laser beam is irradiated with modulation of an applied magnetic field, while the recording is executed. However, the above recording methods have drawbacks such that the scale of the apparatus is large, the costs are high, the modulation cannot be performed at a high speed, and the like.

Therefore, the applicant of the present invention has already filed an applicant directed to a magnetooptic recording method which can solve the drawbacks of the recording methods mentioned above (refer to Japanese Patent Kokai 63-153752 and the like). In this recording method, hi-level recording is performed by using a magnetooptic recording medium having vertical magnetization films of a double layer structure (first and second magnetic layers), providing two levels of laser power from a recording head (at the same time, applying a bias magnetic field), and providing a magnetic field in positions other than a head portion. The binary recording bits comprise (i) a bit where the magnetizing direction of the first magnetic layer is oriented in a stable direction relative to the magnetizing direction of the second magnetic layer and (ii) a bit where the magnetizing direction of the first magnetic layer is oriented in an unstable direction relative to the magnetizing direction of the second magnetic layer.

The above recording method can be realized by a small size recording/reproducing apparatus of a relatively simple construction. The modulation also can be executed at a relatively high speed. The overwriting also can be executed in a manner similar to recording an the magnetic recording medium.

However, even the above method has the following problems.

In the magnetooptic medium having the vertical magnetization films of a double layer structure which is used in the above method, in order to allow the state of (ii) wherein the recording bit is to stably exist, an exchange connecting force between two layers must be conveniently adjusted.

However, it is very difficult to perform such an adjustment of the exchange connecting force and it is hard to manufacture a medium which can provide a practical use level.

Therefore, to solve such a problem, the present applicant also has proposed that a third magnetic layer made of a material which exhibits an in-surface (or in-plane) magnetizing direction at a room temperature and also exhibits a perpendicular magnetizing direction at an elevated temperature upon recording or the like is provided between the first and second magnetic layers in order to adjust the exchange connecting force between the first and second magnetic layers (refer to Japanese Patent Kokai 63-316343).

The above proposal will now be described further in detail. The third magnetic layer exhibits the in-surface magnetizing direction at room temperature and reduces the exchange connecting force between the first and second magnetic layers, thereby stabilizing the recording bit of the first magnetic layer. On the other hand, when temperature rises upon recording or the like, the third magnetic layer exhibits the perpendicular magnetizing direction and increases the exchange connecting force between the first and second magnetic layers from that at room temperature, thereby enabling the magnetizing direction of the second magnetic layer to be stably transferred to the first magnetic layer.

However, even in such a medium, the in-surface magnetization of the third magnetic layer at room temperature becomes unstable due to influences by the magnetizations of the first and second magnetic layers, an elevated temperature in the apparatus, and the like, and the device cannot function sufficiently. Therefore, there is a problem of stability of the recording bit of the first magnetic layer. Such an instability of the recording bit results in a large obstacle when executing stable reproduction.

SUMMARY OF THE INVENTION

The present invention is made in consideration of the foregoing problems and it is an object of the invention to provide a magnetooptic recording and reproducing apparatus and method in which stable reproduction can be performed and overwriting by the light modulation can be executed.

The above object is accomplished by a method of recording a binary signal by using a magnetooptic recording medium having a first magnetic layer which has a low Curie point and a high coercive force and has a perpendicular magnetic anisotropy, a third magnetic layer having a higher Curie point and a lower coercive force than those of the first magnetic layer, and a second magnetic layer which is provided between the first and third magnetic layers and has an in-surface magnetic anisotropy at room temperature and exhibits a perpendicular magnetic anisotropy when temperature rises, the method comprising the following steps:

(a) at a position away from a laser irradiating section of the medium, there is applied a predetermined magnetic field such that the third magnetic layer can be magnetized in a uniform perpendicular direction and the second magnetic layer can be magnetized in the uniform in-surface direction; and (b) a recording bias magnetic field is applied to the laser irradiating section of the medium and, at the same time, a laser beam of a power such as to raise the temperature of the medium until a temperature near the Curie point of the first magnetic layer is irradiated in accordance with a recording signal, thereby orienting the magnetizing direction of the first magnetic layer into the stable direction for the third magnetic layer without changing the magnetizing direction of the third magnetic layer; or (c) a recording bias magnetic field is applied to the laser irradiating section of the medium and, at the same time, a laser beam of only a power such as to raise the temperature of the medium to a temperature near the Curie point of the third magnetic layer is irradiated in accordance with a recording signal, thereby reversing the magnetizing direction of the third magnetic layer and also magnetizing the first magnetic layer in the stable direction for the third magnetic layer.

On the other hand, the above object is accomplished by a magnetooptic recording apparatus which can overwrite and record a binary signal by using a magnetooptic recording medium having: a first magnetic layer which has a low Curie point and a high coercive force and has a perpendicular magnetic anisotropy; a third magnetic layer having a higher Curie point and a lower coercive force than those of the first magnetic layer; and a second magnetic layer which is provided between the first and third magnetic layers and has an in-surface magnetic anisotropy at room temperature and exhibits a perpendicular magnetic anisotropy when temperature rises, wherein the apparatus comprises:

(a) means for generating an initialization magnetic field which can magnetize the second magnetic layer in a uniform in-surface direction and can also magnetize the third magnetic layer in a uniform perpendicular direction at a position away from a laser irradiating section;

(b) recording bias magnetic field generating means for generating a predetermined magnetic field in the laser irradiating section;

(c) laser beam generating and irradiating means for generating and irradiating a laser beam having a binary recording power which is not zero in accordance with a recording signal to the medium; and (d) relative moving means for relatively moving the medium to the laser beam generating means.

The details of the above method and apparatus will be described with respect to an embodiment, which will be explained hereinafter.

BRIEF DESCRIPTION OF THE DRAWINGS

FIGS. 1A and 1B are diagrammatical cross sectional views showing constructions of magnetooptic media which are used in a magnetooptic recording and reproducing method and apparatus according to the invention, respectively;

FIGS. 2A to 2E are diagrams showing magnetizing directions of magnetic layers of the media shown in FIGS. 1A and 1B in a recording process of the invention;

FIG. 7 is a diagram showing the details of a magnetic field generating section in the apparatus shown in FIG. 3.

DETAILED DESCRIPTION OF THE PREFERRED EMBODIMENTS

The present invention will be described in detail hereinbelow with reference to the drawings.

Figure 4:
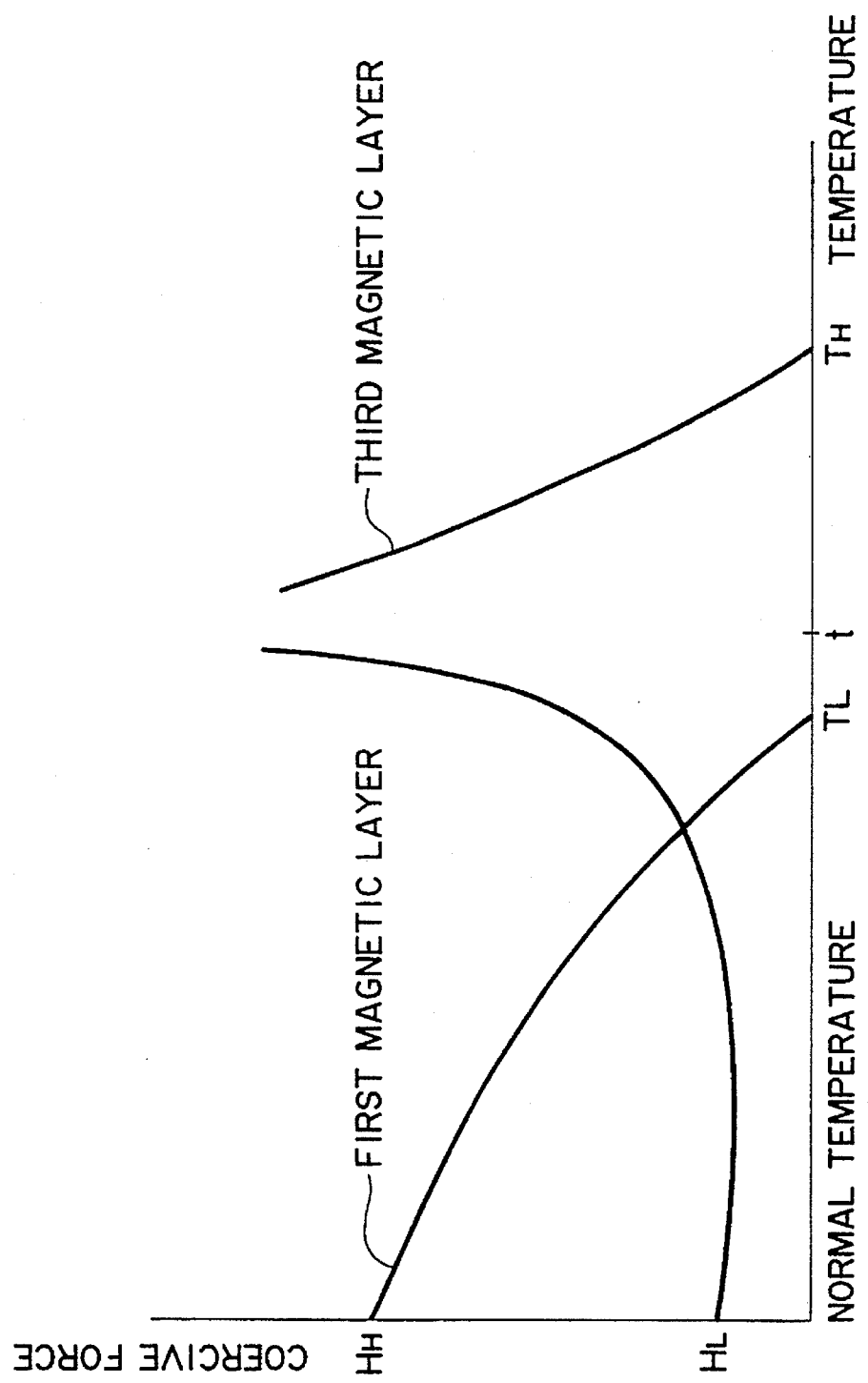
FIG. 4 a diagram showing the relations among the coercive forces of the first and third magnetic layers in the media shown in FIGS. 1A and 1B and the temperatures.
Figures 2, 5A:
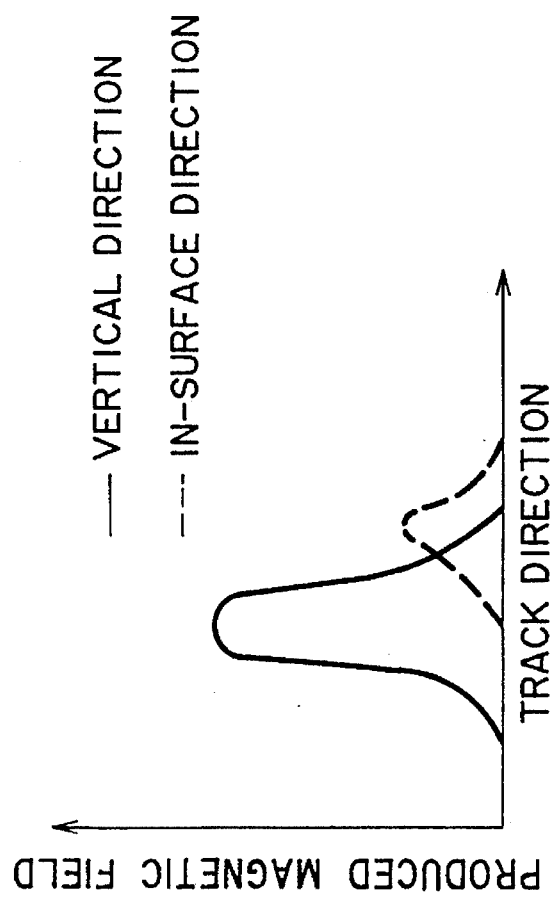
FIGS. 5A-1 to 5B-2 are diagrams showing shapes of magnet pairs in a magnetic field generating section and intensity distributions of generating magnetic fields.
Figures 1, 5A:
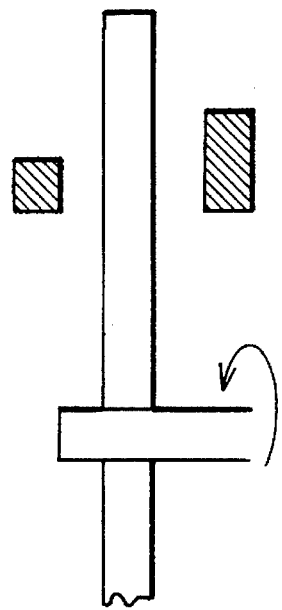

FIG. 1A is a diagrammatical cross-sectional view showing a construction of an embodiment of a magnetooptic recording medium which is used in the invention. The magnetooptic recording medium is constructed by sequentially laminating and forming a first magnetic layer 2, a second magnetic layer 3, and a third magnetic layer 4 onto a translucent substrate 1 on which pregrooves were formed. As a main component of the magnetic layer, it is sufficient to use a component which exhibits a magnetooptic effect. In particular, an amorphous magnetic alloy of a rare earth element and a transition metal element is suitable. For instance, GdCo, GdFe, TbFe, DyFe, GdTbFe, TbDyFe, GdDyFe, GdTbFeCo, DyFeCo, TbFeCo, GdTbCo, GdDyFeCo, etc. can be mentioned. For example, as shown in FIG. 4, the first magnetic layer has a relatively low Curie point $(T_L)$ and a relatively high coercive force $(H_H)$. For instance, in the case when the magnetic layer is made of an amorphous alloy of a rare earth element and a transition metal element, there can be two cases wherein an intensity of the sublattice magnetization of the transition metal is larger and wherein an intensity of the sublattice magnetization of the rare earth element is larger. The first magnetic layer functions for recording and reproduction.

The third magnetic layer has a high Curie point $(T_H)$ and a low coercive force $(H_L)$. For example, if the third magnetic layer is made of an amorphous magnetic alloy of a rare earth element and a transition metal element, an intensity of the sublattice magnetization of the rare earth element is larger. On the other hand, the third magnetic layer has a compensation point within a temperature range from $T_H$ to room temperature. As to the compensation point (t), a value within a range from about 70° C. to 250° C. is desirable. The third magnetic layer 4 functions as an auxiliary layer upon recording of the first magnetic layer.

The terms "high" and "low" with respect to the Curie point and the coercive force show the relative relations in the case wherein both of the magnetic layers are compared (the coercive force is based on the comparison at room temperature).

Each of the first and third magnetic layers has a perpendicular magnetic anisotropy (the easy magnetizing direction is perpendicular to the substrate).

On the other hand, the second magnetic layer has a component whose easy magnetizing direction is not perpendicular to the substrate surface at room temperature. That is, the second magnetic layer has an in-surface magnetic anisotropy at room temperature. In the specification, the term "room temperature" denotes a temperature in the case of ordinary use of the magnetooptic recording medium. Practically speaking, "room temperature" denotes about −10° C. to 70° C. The phrase "has an in-surface magnetic anisotropy" means that the magnetic layer has an in-surface-magnetic anisotropy .enough to obstruct the coupling by the magnetic exchanging force between the first and third magnetic layers to an extent such as to provide an effect of the invention, which will be explained hereinafter. That is, in the recording method of the invention, there is a feature such that an intensity $H_H$eff or $H_L$eff of the effective bias magnetic field which appears when the first and third magnetic layers are coupled by the exchanging force through the second magnetic layer changes so as to increase at an elevated temperature as compared with that at the room temperature. It is sufficient that a degree of the in-surface magnetic anisotropy of the second magnetic layer at the room temperature is set to a value such that the orientation of the magnetization is saturated by applying a magnetic field in the in-surface direction which is smaller than 2 KOe, preferably, 0.5 KOe or less. It is desirable that a degree of the in-surface magnetic anisotropy of the second magnetic layer when the medium was heated and its temperature approached $T_L$ is set so as to have characteristics such that the magnetization orientation in the in-surface direction is not saturated by applying a magnetic field in the in-surface direction of a recording bias magnetic field (100 to 500 Oe) but the magnetization orientation is saturated by applying the magnetic field in the perpendicular direction.

If the second magnetic layer is made of, e.g., an amorphous magnetic alloy of a rare earth element and a transition metal element, an intensity of the sublattice magnetization of the rare earth element is larger and a ratio of the rare earth element in the magnetic layer lies within a range from 0.2 to 0.5 when it is expressed by a ratio of the number of atoms, i.e., (rare earth element)/(rare earth element+transition metal element).

The value of $T_L$ of the first magnetic layer is desirably set to about 70° to 250° C., preferably, about 90° to 200° C. The value of $H_H$ of the first magnetic layer is desirably set to 3 KOe or more, preferably, 7 KOe or more.

The value of $T_H$ of the third magnetic layer is desirably set to about 100° to 400° C., preferably, about 150° to 300° C. The value of $H_L$ of the third magnetic layer is desirably set to 0.1 to 3 KOe, preferably, 0.5 to 2 KOe. It is sufficient to set the Curie point of the second magnetic layer to a value between $T_L$ and $T_H$.

FIG. 1B is a diagrammatical cross sectional view showing a construction of another embodiment of a magnetooptic recording medium of the invention. The medium of FIG. 1B has protective films 5 and 6 to improve the durability of the magnetic layer and also has an adhering substrate 8 adhered to the protective film 6 by an adhesive layer 7. On the other hand, if the layers 2 to 6 are also laminated onto the adhering substrate 8 and adhered, the recording and reproduction can be performed to both sides.

An embodiment of a recording method of the invention will now be described with reference to FIGS. 2 to 4. In the invention, the stable magnetizing directions of the magnetic layers when the first and third magnetic layers are strongly exchange coupled (that is, when the temperature was raised) may be either parallel (the same direction) or not parallel (the opposite directions). However, in the following description, it is assumed that the stable magnetizing directions are parallel (namely, the intensity of the sublattice magnetization of each magnetic layer of the rare earth element is larger).

Figure 3:
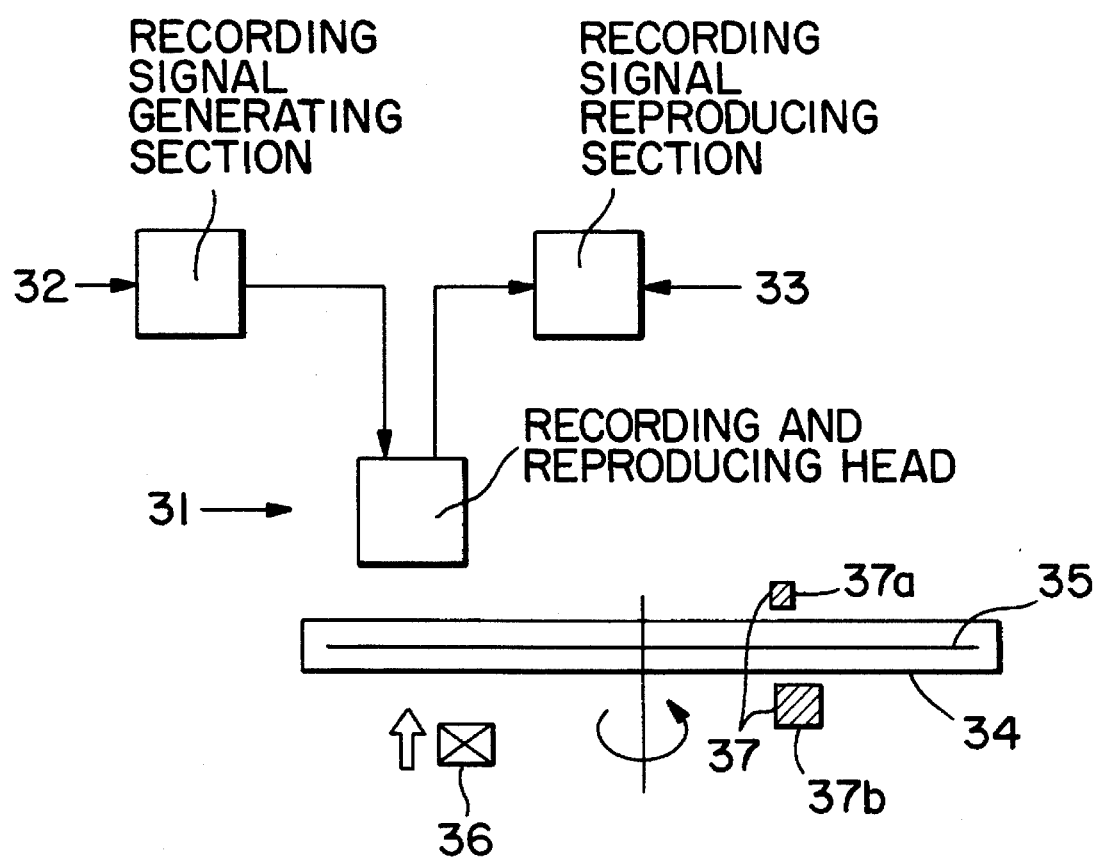
FIG. 3 is a diagram showing a magnetooptic recording and reproducing apparatus of the invention.

FIG. 3 is a schematic diagram of a construction of a recording and reproducing apparatus which can embody the recording method of the invention. The apparatus has a recording and reproducing head 31, a recording signal generating section 32, and a recording signal reproducing section 33.

A magnetooptic disk 35 which was loaded into a cartridge 34 has magnetic field applying means 37 which is arranged at a position away from recording bias magnetic field (upward in the embodiment) generating means 36 arranged at a position spaced from the head 31. The magnetic field applying means 37 applies a predetermined magnetic field through the cartridge 34 (in the embodiment, in the upper perpendicular direction and simultaneously in the in-surface direction of the horizontal direction).

While an upward recording bias magnetic field is applied at the position of the recording and reproducing head 31 and the magnetooptic disk 35 is rotated, a laser beam having two levels of laser power values is irradiated from the head 31 to the disk 35 in accordance with a signal from the recording signal generating section 32. The first kind of laser power has a value such as to raise the temperature of the disk 35 to a value near the Curie point $T_L$ of the first magnetic layer. The second kind of laser power has a value such as to raise the temperature of the disk 35 to a value which is equal to or higher than the compensation point (t) of the third magnetic layer and is near the Curie point $T_H$ of the third magnetic layer.

The magnetic field generating section 37 generates a predetermined magnetic field of an intensity such that it can respectively uniformly magnetize the second and third magnetic layers in the in-surface direction and the perpendicular (upward) direction. Due to the rotation of the magnetooptic disk 35, the disk 35 is first set into a magnetizing state as shown in FIG. 2A as an example at the room temperature (before the laser beam is irradiated). After the recording by the laser was executed, the portion recorded by the first level of laser power results in a recording bit in the magnetizing state shown in FIG. 2B, while the portion recorded by the second level of laser power results in a recording bit in the magnetizing state shown in FIG. 2C.

In the description, it is assumed that a state when the magnetizing directions of the first and third magnetic layers are the same (parallel) is a stable state.

(i) The recording (the first kind of recording) by applying the first level of laser power will be described hereinbelow. The temperature of the disk 35 is raised to a value near $T_L$ by the first level of laser power. As shown in FIG. 4, at a temperature near $T_L$, the third magnetic layer has an enough coercive force and it is very hard to change the magnetizing direction (upward). On the other hand, at a temperature near $T_L$, the ratio of the in-surface easy magnetization component of the second magnetic layer decreases and the second magnetic layer strongly exhibits the perpendicular magnetic anisotropy as compared with those at the room temperature, so that the first and third magnetic layers are magnetically strongly exchange coupled. Thus, the first magnetic layer is upwardly arranged by the exchange force (effective bias magnetic field which is received from the third magnetic layer) which is received from the third magnetic layer. The recording bit in the magnetization state (stable state at the point of the exchange force) shown in FIG. 2B is formed.

(ii) The recording (the second level of recording) by applying the second level of laser power will now be described. The temperature of the disk 35 is raised by the second level of laser power to a temperature t or higher, preferably, a value near $T_H$. In the temperature elevating process, the magnetizing direction of the third magnetic layer is reversed to the downward direction at a temperature near t. This is because at such a point, the sublattice magnetization changes from the rare earth element preference to the transition metal preference and the magnetizing direction is changed to the opposite direction and the magnetization reversal occurs. When the temperature is further raised and reaches a value near $T_H$, the magnetizing direction of the third magnetic layer is changed to the upward direction by the (upward) bias magnetic field. However, after the second laser power was applied, the temperature of the disk 35 decreases. When it again reaches a temperature near t, the magnetizing direction is again reversed to the downward direction due to the reason similar to the above. When the temperature of the disk 35 drops to $T_L$ or lower, as mentioned above, since the first and third magnetic layers are magnetically strongly coupled and, at this time point, the magnetizing direction of the third magnetic layer is the downward direction, the magnetizing direction of the first magnetic layer is also oriented to the downward direction by the exchange force. (The recording bit shown in FIG. 2C is formed.)

As will be obviously understood from the above items (i) and (ii), the intensity of the bias magnetic field which is applied to the position of the recording and reproducing head 31 generally needs to be set to the following values.

(A) A value such as not to obstruct the orientation of the magnetizing direction of the first magnetic layer even when the temperature was raised by applying the first level of laser power (B) A value such that it is possible to assist the reversal of the magnetizing direction of the third magnetic layer when the temperature of the medium was changed to a value near $T_H$ by applying the second level of laser power Therefore, it is preferable to set the bias magnetic fields to the minimum values which are needed in the above items (A) and (B). A proper range of the recording bias magnetic field lies within a range from 50 Oe to 500 Oe. When the bias magnetic field is smaller than a value of such a range, there is a case wherein it becomes difficult to cause the magnetization reversal of the third magnetic layer. If the bias magnetic field is larger than this range, there is a case wherein recording noises increase.

As described above, in the medium of the invention, when the temperature rises, the exchange force of both of the layers becomes relatively strong. Therefore, in both of the above items (i) and (ii), the orientation of the first magnetic layer by the exchange force from the third magnetic layer at a temperature near $T_L$ is stably performed.

When the disk 35 rotates and passes through the magnetic field generating section 37, the second and third magnetic layers are magnetized in predetermined in-surface perpendicular directions, respectively. Therefore, the recording bits shown in FIGS. 2B and 2C and formed by the recording processes in the above items (i) and (ii) change to magnetizing states as shown in FIGS. 2D and 2E, respectively. In the states of FIGS. 2D and 2E, since the second magnetic layer is strongly oriented in the in-surface direction, the exchange force acting between the first and third magnetic layers is remarkably weakened and the stabilities of the recording bits for the magnetic field or the ability to increase the temperature are improved.

The information written to the disk 35 as a recording bit in the magnetizing state shown in FIG. 2D or 2E by the above,described recording method of the invention can be reproduced by irradiating a laser beam of a reproduction power to the disk 35 and by processing the reflected lights or the like by the recording signal reproducing section 33, or the like.

Explanation will now be made with respect to the second magnetic layer which has an in-surface magnetic anisotropy at the room temperature and exhibits a perpendicular magnetic anisotropy when the temperature rises.

Hitherto, assuming that a saturation magnetization of the magnetic thin film is set to $M_S$ and a uniaxial anisotropic magnetic field in the direction perpendicular to the film surface is set to $H_K$, it is known that it is necessary to satisfy the relation of $H_K \leq 4\pi M_S$ to construct the magnetic thin film as a magnetization film perpendicular to the film surface. Therefore, to construct in a manner such that the magnetization easiness axis of the second magnetic layer is set in the in-surface direction of the substrate at the room temperature and is set in the direction perpendicular to the substrate surface at a recording temperature range, it is sufficient that the second magnetic layer satisfies the relation of $H_K < 4\pi M_S$ at the room temperature and that the Curie temperature of the second magnetic layer is set to a value near the recording temperature. That is, since the $M_S$ suddenly decreases at a temperature near the Curie temperature, the relation of $H_K < 4\pi M_S$ at the room temperature can be changed to the relation of $H_K \geq 4\pi M_S$ in the recording temperature region. Further, when the component perpendicular to the substrate surface increases by the magnetization of the second magnetic layer, the magnetizing direction of the second magnetic layer is further oriented in the direction perpendicular to the substrate surface by the exchange forces from the first and third magnetic layers.

At this time, as the coercive force of the second magnetic layer in the perpendicular direction is small, the orientation is easily performed.

In the following examples and comparison examples, slide glass substrates to monitor were set into a sputter film forming apparatus and films were formed simultaneously with the sample disks and the magnetizations and the coercive forces were measured by using a VSM (sample vibrating type magnetization measuring apparatus).

(EXAMPLE 1)

A disk-like substrate made of polycarbonate on which pregrooves and a preformat signal had been formed was set into a sputtering apparatus having four target sources at a position of an interval distance of 10 cm from targets. The substrate was rotated at a speed of 20 r.p.m. and was sputtered in argon from the first target at a sputtering rate of 100 Å/min and at a sputtering pressure of $5 \times 10^{-3}$ Torr, so that an $Si_3N_4$ layer (protective layer) of 800 Å was formed.

Then, a DyFeCo alloy was sputtered in argon from the second target at a sputtering rate of 100 Å/min and at a sputtering pressure of $5 \times 10^{-1}$ Torr. A first magnetic layer of $Dy_{21}Fe_{69}Co_{10}$ having a film thickness of 500 Å, a Curie point of about 160° C., and a coercive force of 20 kOe or more was formed. The sublattice magnetizations of Fe and Co atoms in the first magnetic layer were larger.

Then, a GdFeCo alloy was sputtered in argon from the third target at a sputtering rate of 100 Å/min and at a sputtering pressure of $5 \times 10^{-1}$ Torr. A second magnetic layer of $Gd_{30}Fe_{50}Co_{20}$ having a film thickness of 200 Å, a Curie point of about 170° C., and coercive forces of almost zero in both of the perpendicular direction and the in-surface direction were formed. If the second magnetic layer is constructed as a single layer, the magnetizing direction can be oriented in the in-surface direction by an external magnetic field of about 0.5 kOe or less. However, the external magnetic field of about 2.5 kOe or more was needed to orient the magnetizing direction into the direction perpendicular to the substrate.

Then, a TbFeCo alloy was sputtered in argon from the fourth target at a sputtering rate of 100 Å/min and at a sputtering pressure of $5 \times 10^{-1}$ Torr. A third magnetic layer of $Tb_{23}Fe_{67}Co_{10}$ having a film thickness of 500 Å, a Curie point of about 210° C., a compensation temperature of 170° C., and a coercive force of about 1.5 kOe was formed. The sublattice magnetization of Tb atoms in the third magnetic layer was larger.

Then, an $Si_3N_4$ film having a thickness of 1000 Å was formed in argon from the first target at a sputtering rate of 100 Å/min and a sputtering pressure of $5 \times 10^{-3}$ Torr.

Then, the above substrate on which the films were formed was adhered to an adhering substrate made of polycarbonate by using a hot melting adhesive agent and a disk-like magnetooptic recording medium was formed.

The above magnetooptic recording medium was set into the recording and reproducing apparatus having a construction as shown in FIG. 3. A laser beam having a wavelength of 830 nm which had been converged to a diameter of about 1.4 μm was modulated at a duty ratio of 50% and a frequency of 2 MHz, while the recording was executed by using a laser beam having binary powers of 4 mW and 9 mW. The recording bias magnetic field was set to 400 Oe. In the magnetic field generating section 37 which can magnetize the second and third magnetic layers in a predetermined direction, lengths in the disk track direction of a pair of permanent magnets 37a and 37b which sandwich the magnetooptic disk 35 differ as shown in FIG. 5A, so that the magnetic field in the perpendicular direction is maximum at a position near the central point of the upper magnet and the magnetic field in the in-surface direction is maximum at a position near the peripheral edge portion of the upper magnet. As a result of the measurements by a Gauss meter, the maximum magnetic field in the perpendicular direction was 2.5 kGauss and the maximum magnetic field in the in-surface direction was 1 kGauss.

After that, by irradiating the laser beam of 1.5 mW, a binary signal could be reproduced. A C/N ratio was about 53 dB. On the other hand, the similar recording was performed onto the whole disk surface at a modulating frequency of 3 MHz by using the magnetooptic recording medium after the recording similar to the above had been executed onto the whole disk surface. As a result of the reproduction, only the signal of 3 MHz was detected and it has been confirmed that good overwriting was executed. The C/N ratio was about 52 dB.

Then, the reproduction laser power at which the deterioration of the recording bits (reproduction signal C/N ratio) at a frequency of 3 MHz starts was examined, so that it was 2.8 mW.

(Comparison Example 1)

Figures 2, 5B:
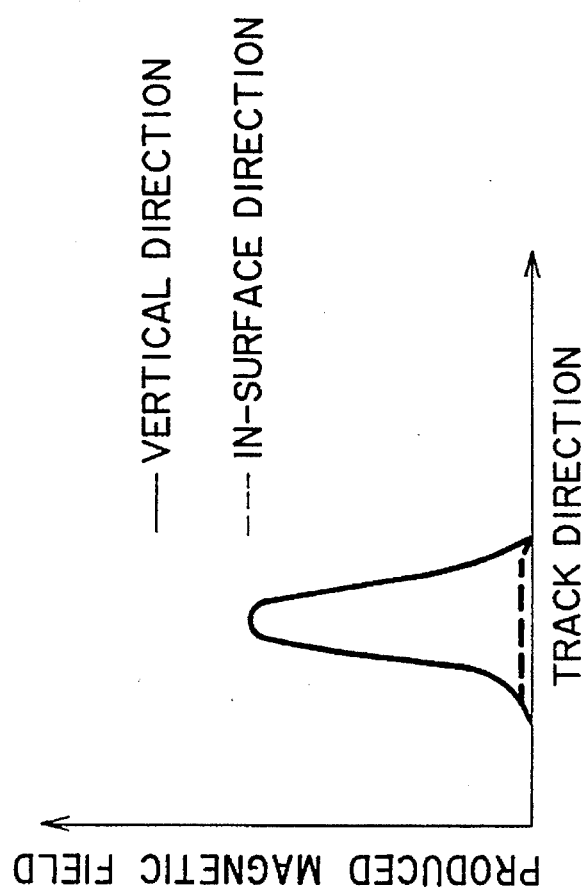
Figures 1, 5B:
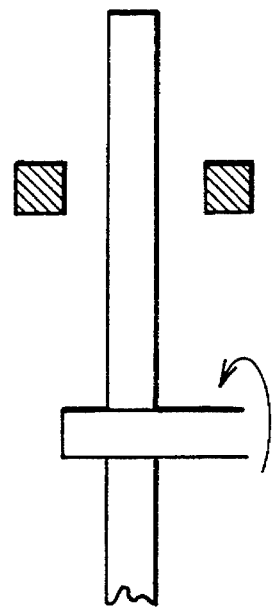

The recording experiments similar to those in the Example 1 were executed by using the magnetooptic recording medium of Example 1 by the recording and reproducing apparatus using a magnetic field generating section 37 as shown in FIG. 5B. Lengths in the disk track direction of a pair of permanent magnets which sandwich the magnetooptic disk 35 are the same, so that the magnetic field in the perpendicular direction is maximum at a position near the central point of the upper magnet and the magnetic field in the in-surface direction is maximum at a position near the peripheral edge portion of the upper magnet. As a result of the measurement by using the Gauss meter, the maximum magnetic field in the perpendicular direction was 2.5 kGauss and the maximum magnetic field in the in-surface direction was 0.1 kGauss. Although the reproduction C/N ratio of the recorded signal was the same as that in Example 1, the reproduction laser power at which the deterioration of the recording bits starts was so small to be 1.4 mW and it has been found that the thermal stability of the recording bits is worse than Example 1.

Figure 6A:
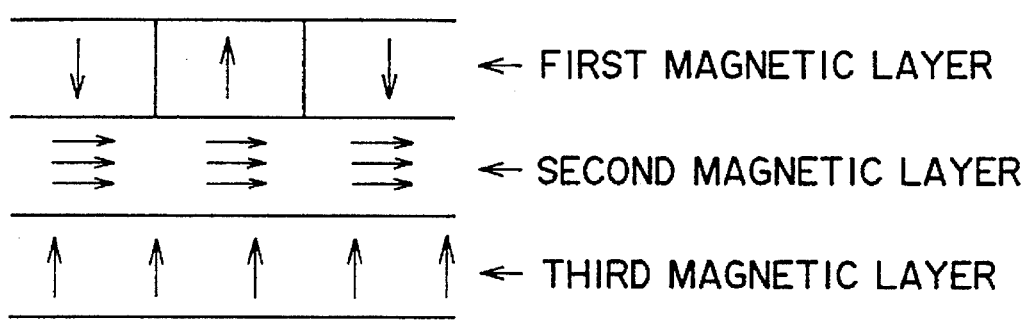
FIGS. 6A and 6B are diagrams showing magnetizing states of recording bits in detail.
Figure 6B:
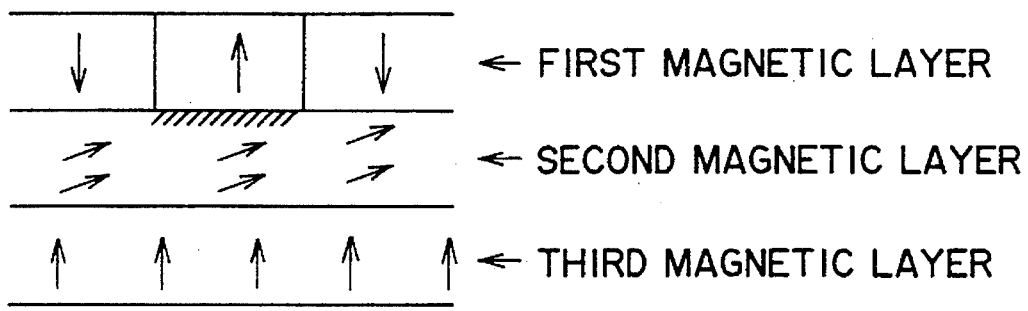

The reasons for the above results can be described by the magnetization state of the recording bits shown in FIGS. 6A and 6B. FIGS. 6A and 6B show magnetization states of the recording bits according to Example 1 and Comparison example 1, respectively. The central portion in each of the diagrams corresponds to the region where the recording power (8 mW in Example 1 and Comparison example 1) which can raise the temperature to a value which is equal to or higher than the compensation point of the third magnetic layer was given. In this region, after the recording, the magnetization of the third magnetic layer is again reversed by the magnetic field generating section and the magnetizing directions of the first and third magnetic layers are oriented in the unstable direction (in this case, the anti-parallel magnetization state is stable). In FIG. 6B, although the second magnetic layer can be easily magnetized in the in-surface direction, the magnetization component in the perpendicular direction is also produced by the magnetic field from the magnetic field generating section and the exchange forces from the first and third magnetic layers. A magnetic wall is formed at the interface between the first and second magnetic layers (hatched portion). The interface magnetic wall makes unstable the magnetization of the first magnetic layer formed with the bits, particularly, when the reproduction laser power is increased and the temperature of the recording layer was raised.

On the other hand, in FIG. 6A, since there is a strong magnetic field in the in-surface direction in the magnetic generating section, the magnetizing direction of the second magnetic layer is oriented almost in the in-surface direction and the strong exchange force does not act between the first and third magnetic layers as well. Therefore, even if the reproduction laser power is increased and the temperature of the recording layer is raised, the recording bits are stably held.

(EXAMPLE 2)

In a manner similar to Example 1, sample disks of examples 2-1 to 2-6 were formed and the similar recording experiments were performed. By exchanging the sputtering targets, only the material composition of the second magnetic layer was changed as shown in Table 1. In the recording experiments, by changing a combination of the magnetizing magnets in FIG. 3B, the magnetic fields in the perpendicular and in-surface directions of the initializing magnetic fields which had been applied in the experiments were changed as shown in Table 1. In Table 1, a "perpendicular saturation magnetic field" was obtained by using the VSM (sample vibrating type magnetization measuring apparatus). The applied magnetic fields which are necessary to saturate the magnetization of the second magnetic layer in the perpendicular direction are shown. As reproduction C/N ratio and maximum reproduction power, the reproduction C/N ratio of the signal which was recorded by the modulating frequency of 3 MHz and the maximum reproduction power such as not to cause a deterioration of the recording bits upon reproduction of the signal are shown.

TABLE 1

| Sample | Compositions of the 2nd magnetic layer | Perpendicular saturation magnetic field (Oe) | Initialization perpendicular magnetic field (Oe) | Initialization in-surface magnetic field (Oe) | Reproduction C/N ratio (dB) | Max reproduction power (mW) |
|---|---|---|---|---|---|---|
| Example 2 - 1 | $Gd_{30} Fe_{50} Co_{20}$ | 2.5k or more | 2.5k | 0.5k | 53 | 2.7 |
| Example 2 - 2 | " | 2.5k or more | " | 0.3k | 53 | 2.5 |
| Example 2 - 3 | " | 2.5k or more | " | 0.2k | 53 | 1.7 |
| Example 2 - 4 | $Dy_{32} Fe_{27} Co_{30} Ti_{10}$ | 1k | " | 1k | 54 | 1.4 |
| Example 2 - 5 | $Dy_{35} Fe_{25} Co_{30} Ti_{10}$ | 3k | " | 1k | 53 | 2.5 |
| Example 2 - 6 | $Dy_{37} Fe_{23} Co_{30} Ti_{10}$ | 5k | " | 1k | 53 | 3.0 |

According to the results shown in Table 1, it will be understood from Examples 2-1 to 2-3 that in order to obtain sufficient maximum reproduction power, it is desirable to set the initialization in-surface magnetic field to 0.3 KOe or more. (After the recording, the magnetizing direction of the second magnetic layer is strongly oriented in the perpendicular direction at the interface between the first and third magnetic layers. In order to obtain the sufficient maximum reproduction power, it is necessary to again orient the magnetizing direction in the in-surface direction by the surface direction magnetic field of 0.3 KOe or more.)

On the other hand, it will be understood from Examples 2-1 to 2-6 that in order to obtain the sufficient maximum reproduction power, it is preferable to adjust the compositions so that the perpendicular saturation magnetic field of the second magnetic layer is equal to or larger than 2.5 KOe.

(EXAMPLE 3)

The combination of the shapes of the magnetizing magnets in FIG. 5A was changed as shown in Table 2 and the maximum values of the initialization perpendicular magnetic fields and of the initialization in-surface magnetic fields which are applied were measured. The magnetic field in the perpendicular direction is maximum at a position of almost the central portion of the pair of magnetizing magnets. The magnetic field in the in-surface direction is maximum at a position of the peripheral edge portions of the pair of magnetizing magnets. (The measurements were executed at the intermediate position of the pair of magnets.)

FIG. 7 shows the shapes of the pair of magnets 37a and 37b. In FIG. 7, a and b denote thicknesses (heights) of the magnets and c and d indicate lengths in the track direction of the magnets, respectively. An interval between the opposite magnets was set to 10 mm as shown in FIG. 7.

TABLE 2

| Sample of magnetizing magnets | Material of magnet (1) | a (m/m) | c (m/m) | Material of magnet (2) | b (m/m) | d (m/m) | Maximum magnetic field in the perpendicular direction (Oe) | Maximum magnetic field in the in-surface direction (Oe) |
|---|---|---|---|---|---|---|---|---|
| Example 3-1 | Barium ferrite | 30 | 10 | Barium ferrite | 30 | 20 | 2000 | 500 |
| Example 3-2 | " | 20 | 10 | Samarium cobalt | 20 | 5 | 2000 | 400 |
| Example 3-3 | Samarium cobalt | 10 | 5 | " | 10 | 10 | 1600 | 400 |
| Example 3-4 | " | 10 | 6 | " | 10 | 20 | 2000 | 500 |
| Example 3-5 | " | 10 | 5 | " | 20 | 20 | 2500 | 500 |
| Comparison example 3-1 | " | 15 | 15 | Barium ferrite | 15 | 15 | 1600 | 150 |
| Comparison example 3-2 | " | 10 | 10 | Samarium cobalt | 10 | 10 | 1800 | 150 |

It will be understood from the above results that in order to largely set the initialization in-surface magnetic field, it is effective to change the shapes (mainly, the lengths of c and d) of the opposite magnets as shown in Examples 3-1 to 3-5.

What is claimed is:

1. A magneto-optical recording method for initializing a magneto-optical recording medium and for recording and overwriting a binary signal on the magneto-optical recording medium, which includes a first magnetic layer having a low Curie point and a high coercive force having a perpendicular magnetic anisotropy, a third magnetic layer having a higher Curie point and a lower coercive force than those of the first magnetic layer and a second magnetic layer provided between the first and third magnetic layers and having an in-surface magnetic anisotropy at room temperature and exhibiting a perpendicular magnetic anisotropy when temperature rises, said method comprising the steps of:

rotating the recording medium;

applying to the recording medium an initialization external perpendicular magnetic field for orienting a magnetizing direction of the third magnetic layer in a uniform perpendicular direction;

applying to the recording medium an initialization external in-surface magnetic field for orienting a magnetizing direction of the second magnetic layer in an in-surface direction;

thereafter, irradiating the recording medium with a light beam having a first non-zero power level while applying a perpendicular biasing magnetic field to the recording medium, the temperature of the first magnetic layer being caused to rise higher than its Curie point, and the temperature of the third magnetic layer being caused to rise near its Curie point to orient the magnetizing direction of the second magnetic layer in the perpendicular direction of the biasing magnetic field and to orient the magnetizing direction of the first magnetic layer in a stable direction relative to the magnetizing direction of the third magnetic layer;

irradiating the recording medium with a light beam having a second non-zero power level, lower than the first power level, while applying a perpendicular biasing magnetic field to the recording medium, the temperature of the first magnetic layer being caused to rise near its Curie point to orient the magnetizing direction of the first magnetic layer in a stable direction relative to the magnetizing direction of the third magnetic layer; and selecting the first and second power levels according to information to be recorded.

2. A magneto-optical recording apparatus for recording and overwriting a binary signal on a magneto-optical recording medium, said apparatus comprising:

a magneto-optical recording medium including a first magnetic layer which has a low Curie point and a high coercive force and has a perpendicular magnetic anisotropy, a third magnetic layer having a higher Curie point and a lower coercive force than those of the first magnetic layer, and a second magnetic layer which is provided between the first and third magnetic layers and has an in-surface magnetic anisotropy at room temperature and exhibits a perpendicular magnetic anisotropy when temperature rises;

means for rotating said recording medium;

initialization magnetic field applying means for applying an initialization in-surface magnetic field to the recording medium to set the magnetization direction of the second magnetic layer in a uniform in-surface direction and for applying an initialization, perpendicular magnetic field to the recording medium to set the magnetization direction of the third magnetic layer in a uniform perpendicular direction, said initialization magnetic field applying means facing said recording medium at a first position;

recording bias magnetic field applying means for applying a perpendicular magnetic field to said recording medium, said recording bias magnetic field applying means facing said recording medium at a second position spaced from the first position; and laser beam generating and irradiating means for generating a laser beam having first and second non-zero power levels in accordance with the binary signal to be recorded, and for irradiating said recording medium with the laser beam, said laser beam generating and irradiating means confronting said recording bias magnetic field applying means with respect to said recording medium.

3. An apparatus according to claim 2, wherein said initialization magnetic field applying means applies an in-surface direction magnetic field of at least 0.3 kOe.

4. An apparatus according to claim 3, wherein a perpendicular saturation magnetic field of the second magnetic layer is at least 2.5 kOe.

5. An apparatus according to claim 2, wherein said initialization magnetic field applying means applies a perpendicular direction magnetic field of at least 2.5 kOe.

6. An apparatus according to claim 2, wherein said initialization magnetic field generating applying means comprises a pair of permanent magnets arranged so as to sandwich the medium.

7. An apparatus according to claim 6, wherein the shapes of said pair of permanent magnets differ.

8. An apparatus according to claim 7, wherein the recording medium includes a plurality of tracks, and lengths of said pair of permanent magnets in a track direction of the medium differ.

9. An apparatus according to claim 2, wherein each of the magnetic layers is made of an amorphous magnetic alloy of a rare earth element and a transition metal element.

10. An apparatus according to claim 9, wherein an intensity of a sublattice magnetization of the rare earth element in the second magnetic layer is larger than that of the transition metal element, and a ratio of the rare earth element and a sum of the rare earth element and the transition metal element in the second magnetic layer lies within a range from 0.2 to 0.5 when expressed as a ratio of the number of atoms.

11. An apparatus according to claim 8, wherein the properties of the second magnetic layer satisfy the relation of $H_K < 4\pi M_S$ at the room temperature and also satisfy the relation of $H_K \geq 4\pi M_S$ at a temperature near a recording temperature, where $M_S$ denotes a saturation magnetization of the second magnetic layer and $H_K$ indicates a uniaxial anisotropic magnetic field in the direction perpendicular to the film surface.

* * * * *

UNITED STATES PATENT AND TRADEMARK OFFICE
CERTIFICATE OF CORRECTION

PATENT NO. : 5,502,692  Page 1 of 7
DATED : March 26, 1996
INVENTOR(S) : Yoichi OSATO It is certified that error appears in the above-indentified patent and that said Letters Patent is hereby corrected as shown below:

ON THE COVER PAGE:

Under "References Cited", Item [56],

Under U.S. PATENT DOCUMENTS, the following should be inserted:

```
--3,521,294    7/1970   Treves ............346/74
  4,126,494   11/1978   Imamura et al. ..148/31.57
  4,198,692    4/1980   Kobayashi ..........365/27
  4,556,291   12/1985   Chen .............350/377
  4,612,587    9/1986   Kaneko et al. ......360/59
  4,628,485   12/1986   Tanaka et al. .....365/122
  4,645,722    2/1987   Katayama et al. ...428/694
  4,701,881   10/1987   Tanaka et al. .....365/122
  4,871,614   10/1989   Kobayashi ........428/336--;
```

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

Under FOREIGN PATENT DOCUMENTS, the following should be inserted:--

--3,619,618   12/1986   Germany
  0,217,067    4/1987   Europe
  0,225,141    6/1987   Europe
  0,258,978    3/1988   Europe
  63-153752    6/1988   Japan
  63-316343   12/1988   Japan
  57-078653    5/1982   Japan
  58-050639    3/1983   Japan
  58-108045    6/1983   Japan
  2,110,459    6/1983   United Kingdom
  60-005404    1/1985   Japan
  61-240453   10/1986   Japan--; and

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

Under OTHER PUBLICATIONS, the following should be inserted:

--Kobayashi, et al., "Magnetization Process of Exchange-Coupled Ferromagnetic Double-Layered Films," *Japanese Journal of Applied Physics*, Vol. 20, No. 11, November 1981, pgs. 2089 through 2095.

Patent Abstracts of Japan, Kokai No. 56-153546, Vol. 6, No. 34, March 2, 1982.

Patent Abstracts of Japan, Kokai No. 59-60746, Vol. 8, No. 165, (1984).

Patent Abstracts of Japan, Kokai No. 59-215037, Vol. 9, No. 86, April 16, 1985.

Nippon Kogaku K.K., "Overwrite System of Magnetooptical Disk System," *International Symposium on Magneto-optics*, April 1987, pgs. 1 through 7.

Patent Abstracts of Japan, Kokai No. 59-215044, Vol. 9, No. 86, April 16, 1985.

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

Under "OTHER PUBLICATIONS"

Berkowitz, et al., "Thermomagnetic Recording: Physics and Materials," *IEEE Transactions on Magnetics*, Vol. Mag. 11, No. 4, July 1975, pgs. 996 through 1017.

Tsunashima, et al., "Thermomagnetic Writing on Exchange-Coupled Amorphous Rare-Earth Iron Double-Layer Films," *IEEE Transactions on Magnetics*, Vol. Mag. 17, No. 8, November 1981, pgs. 2840 through 2842.--.

Under "ABSTRACT", Item [57],

Line 5, "the" should be deleted;
Line 7, "first to" should read --first, second and--;
Line 13, "of a power such as" should read --having sufficient power--;
Line 20, "and" should read --and a laser beam having--; and
Line 21, "a laser" should read --sufficient--.

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

COLUMN 1:

Line 37, "applicant" should read --application--; and
Line 58, "an" should read --on--.

COLUMN 3:

Line 46, "cross sectional" should read --cross-sectional--.

COLUMN 7:

Line 15, "power" should read --power.--;
Line 19, "power" should read --power.--;
Line 50, "above,described" should read --above-described--; and
Line 64, "$H_K \leq 4\pi M_S$" should read --$H_K \geq 4\pi M_S$--.

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

COLUMN 8:

Line 38, "$5 \times 10^{-1}$ Torr." should read --$5 \times 10^{-3}$ Torr.--;
Line 45, "$5 \times 10^{-1}$ Torr." should read --$5 \times 10^{-3}$ Torr.--; and
Line 59, "$5 \times 10^{-1}$ Torr." should read --$5 \times 10^{-3}$ Torr.--.

COLUMNS 11 and 12:

Table 2, fourth column (c (m/m)), line 4, "6" should read --5--.

UNITED STATES PATENT AND TRADEMARK OFFICE
CERTIFICATE OF CORRECTION

PATENT NO. : 5,502,692
DATED : March 26, 1996
INVENTOR(S) : Yoichi OSATO

It is certified that error appears in the above-indentified patent and that said Letters Patent is hereby corrected as shown below:

COLUMN 14:

Line 9, "means with respect to said record-" should read --means.--;
Line 10, "ing medium." should be deleted;
Line 21, "generating" should be deleted; and
Line 41, "claim 8," should read --claim 9,--.

Signed and Sealed this

Tenth Day of September, 1996

Attest:

BRUCE LEHMAN

*Attesting Officer*     *Commissioner of Patents and Trademarks*